US010128944B2

(12) United States Patent
Nijssen et al.

(10) Patent No.: US 10,128,944 B2
(45) Date of Patent: Nov. 13, 2018

(54) DETECTING CODED LIGHT

(71) Applicant: PHILIPS LIGHTING HOLDING B.V., Eindhoven (NL)

(72) Inventors: Stephanus Joseph Johannes Nijssen, Eindhoven (NL); Frederik Jan De Bruijn, Eindhoven (NL); Tommaso Gritti, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 120 days.

(21) Appl. No.: 14/893,662

(22) PCT Filed: May 23, 2014

(86) PCT No.: PCT/EP2014/060685
§ 371 (c)(1),
(2) Date: Nov. 24, 2015

(87) PCT Pub. No.: WO2014/187968
PCT Pub. Date: Nov. 27, 2014

(65) Prior Publication Data
US 2016/0112126 A1 Apr. 21, 2016

(30) Foreign Application Priority Data
May 24, 2013 (EP) ..................................... 13169086

(51) Int. Cl.
*G06K 9/46* (2006.01)
*G06K 9/66* (2006.01)
(Continued)

(52) U.S. Cl.
CPC ........... *H04B 10/116* (2013.01); *G03B 7/093* (2013.01); *H04N 5/2353* (2013.01);
(Continued)

(58) Field of Classification Search
CPC ...... G06F 3/14; G06K 9/2027; G06K 9/4661; G06K 7/10732
See application file for complete search history.

(56) References Cited

U.S. PATENT DOCUMENTS 8,334,898 B1 12/2012 Ryan et al.
2009/0268055 A1* 10/2009 Hamilton, Jr. ......... H04N 5/235
348/230.1
(Continued)

FOREIGN PATENT DOCUMENTS

JP 2011078074 A 4/2011
JP 2011166318 A 8/2011
(Continued)

*Primary Examiner* — Vu Le
*Assistant Examiner* — Guillermo Rivera-Martinez
(74) *Attorney, Agent, or Firm* — Meenakshy Chakravorty

(57) ABSTRACT

A device comprising an input for receiving image data representing light captured by a camera, and an image analysis module for detecting a coded light component modulated into the light with a modulation frequency. The camera has an exposure time, and the light is captured over a sequence of exposures each lasting for an instance of the exposure time. The detection performed by the image analysis module experiences a frequency blind spot in said detection due to an effect of said exposure time. To address this issue, the device further comprises an output for controlling one or more parameters of the camera which affect the exposure time, and a controller configured to control the one or more parameters to avoid that the modulation frequency corresponds to the frequency blind spot.

20 Claims, 4 Drawing Sheets

(51) Int. Cl.
  *H04B 10/116* (2013.01)
  *H04N 5/235* (2006.01)
  *G03B 7/093* (2006.01)
  *H04N 5/232* (2006.01)
  *H04N 5/353* (2011.01)
  *G03B 7/08* (2014.01)

(52) U.S. Cl.
  CPC ....... *H04N 5/23229* (2013.01); *H04N 5/3532* (2013.01); *G03B 7/08* (2013.01)

(56) References Cited

U.S. PATENT DOCUMENTS

| | | | |
|---|---|---|---|
| 2012/0062845 A1* | 3/2012 | Davis | G03B 9/08 |
| | | | 352/45 |
| 2012/0194699 A1 | 8/2012 | Kouno | |
| 2012/0195520 A1* | 8/2012 | Ishii | H04N 1/4092 |
| | | | 382/255 |
| 2013/0107063 A1 | 5/2013 | Yano | |
| 2013/0208132 A1* | 8/2013 | Ryan | G01C 21/206 |
| | | | 348/207.11 |
| 2014/0186055 A1* | 7/2014 | Oshima | H04B 10/541 |
| | | | 398/186 |

FOREIGN PATENT DOCUMENTS

| | | |
|---|---|---|
| WO | 2010021249 A1 | 2/2010 |
| WO | 2011086501 A1 | 7/2011 |
| WO | 2011086517 A1 | 7/2011 |
| WO | 2012127439 A1 | 9/2012 |

* cited by examiner ions. Thus the modula-
DETECTING CODED LIGHT

CROSS-REFERENCE TO PRIOR APPLICATIONS

This application is the U.S. National Phase application under 35 U.S.C. § 371 of International Application No. PCT/EP2014/060685, filed on May 23, 2014, which claims the benefit of European Patent Application No. 13169086.9, filed on May 24, 2013. These applications are hereby incorporated by reference herein.

TECHNICAL FIELD

The present disclosure relates to the detection of a coded light component using a camera.

BACKGROUND

Coded light refers to techniques whereby a signal is embedded in the visible light emitted by a luminaire. The light thus comprises both a visible illumination contribution for illuminating a target environment such as room (typically the primary purpose of the light), and an embedded signal for providing information into the environment. To do this, the light is modulated at a certain modulation frequency or frequencies.

In some of the simplest cases, the signal may comprise a single waveform or even a single tone modulated into the light from a given luminaire. The light emitted by each of a plurality of luminaires may be modulated with a different respective modulation frequency that is unique amongst those luminaires, and the modulation frequency can then serve as an identifier of the luminaire or its light. For example this can be used in a commissioning phase to identify the contribution from each luminaire, or during operation can be used to identify a luminaire in order to control it. In another example, the identification can be used for navigation or other location-based functionality, by mapping the identifier to a known location of a luminaire or information associated with the location.

In other cases, a signal comprising more complex data may embedded in the light. For example using frequency keying, a given luminaire is operable to emit on two (or more) different modulation frequencies and to transmit data bits (or more generally symbols) by switching between the different modulation frequencies. If there are multiple such luminaires emitting in the same environment, each may be arranged to use a different respective plurality of frequencies to perform its respective keying.

WO2012/127439 discloses a technique whereby coded light can be detected using a normal "rolling shutter" type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence "rolls" in order across the frame, e.g. in rows top to bottom, hence the name "rolling shutter". When used to capture coded light, this means different lines within a frame capture the light at different times and therefore, if the line rate is high enough relative to the modulation frequency, at different phases of the modulation waveform. Thus the modulation in the light can be detected.

SUMMARY

If a camera is used as detector for coded light, the exposure time of that camera causes blind spots in the frequency spectrum of the camera transfer function. Effectively the camera may not be able to receive all possible modulation frequencies that may be sent out by a coded light source or sources.

According to one aspect disclosed herein, there is provided device comprising an input for receiving image data representing light captured by a camera, and an image analysis module for detecting a coded light component modulated into the light with a modulation frequency. The camera has an associated exposure time, and the light is captured over a sequence of exposures each lasting for an instance of the exposure time. The detection performed by the image analysis module experiences a frequency blind spot due to an effect of said exposure time. To address this, the device is provided with an output for controlling one or more parameters of the camera which affect the exposure time, and a controller configured to control the one or more parameters to avoid that the modulation frequency corresponds to the frequency blind spot.

For instance, in a rolling-shutter camera or similar, the light is captured over a sequence of frames, and in each frame the light is captured by exposing a sequence of spatial portions (typically lines) within the frame. Each of the spatial portions in the sequence is exposed to the light for an instance of the exposure time, and it is this exposure time which causes blind spots in the frequency domain.

The problem of frequency blind spots may be solved by capturing images using different exposure times. For example, two or more different frames may be captured using a different exposure time in different frames. When the coded-light detection is applied to the different images, the coded light component will be found in at least one of those images even if its modulation frequency falls in an undetectable blind spot caused by the exposure time used to capture one or more others of those images.

The exposure time may be controlled using an explicit time setting which directly affects the exposure time, or via another parameter which indirectly affects the exposure time, e.g. an exposure index or "ISO" setting, an exposure value setting (different from the exposure time setting) or a region-of-interest setting.

In embodiments, once a value of the setting (or settings) is found which produces an image in which the coded light component is detected, this may be remembered for future detections. Alternatively the controller may continue to try multiple values each time a detection is to be performed (e.g. to account for the fact that different modulation frequencies may be present indifferent environments or circumstances).

In embodiments, the detection process may have multiple blind spots, and/or there may be multiple modulation frequencies present in an environment. Hence the controller may be configured to control the exposure time to avoid a modulation frequency falling in any of the blind spots (i.e. it falls in none of them), and/or to avoid any of the multiple modulation frequencies falling in a blind spot (i.e. none of them fall in any blind spot).

According to another aspect disclosed herein, there may be provided a computer program product embodied on a computer-readable medium and configured so as when executed to perform any of the operations of the detecting device disclosed herein.

BRIEF DESCRIPTION OF THE DRAWINGS

For a better understanding of embodiments disclosed herein and to show how they may be put into effect, reference is made to the accompanying drawings in which.

DETAILED DESCRIPTION OF EMBODIMENTS

Figure 1:
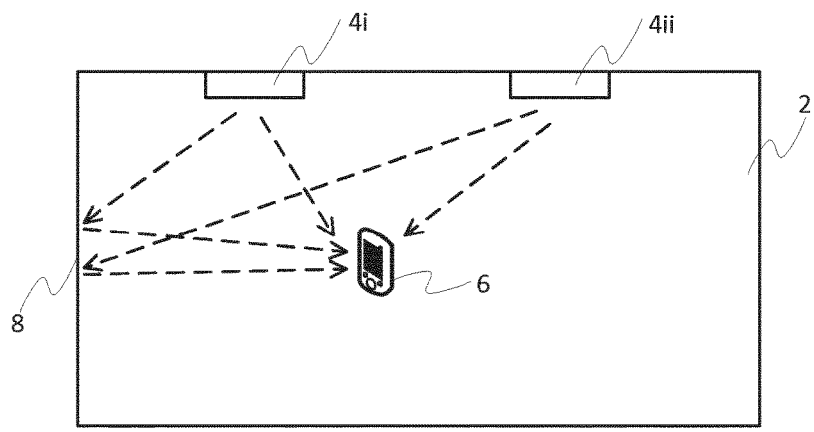
FIG. 1 schematically illustrates a space comprising a lighting system and camera.

FIG. 1 shows an example environment 2 in which embodiments disclosed herein may be deployed. For instance the environment may comprise one or more rooms and/or corridors of an office, home, school, hospital, museum or other indoor space; or an outdoor space such as a park, street, stadium or such like; or another type of space such as a gazebo or the interior of a vehicle. The environment 2 is installed with a lighting system comprising one or more lighting devices 4 in the form of one or more luminaires. Two luminaires 4i and 4ii are shown for illustrative purposes, but it will be appreciated that other numbers may be present. The luminaires may be implemented under central control or as separate, stand-alone units. Also present in the environment 2 is a user terminal 6, preferably a mobile device such as a smart phone or tablet.

Each luminaire 4 comprises a lighting element such an LED, array of LEDs or fluorescent tube for emitting light. The light emitting element may also be referred to as a lamp or light source. The light emitted by the lighting element of each of the one or more luminaires is modulated with a coded light component at a modulation frequency. For example the modulation may take the form of a sinusoid, rectangular wave or other waveform. In the case of a sinusoid, the modulation comprises a single tone in the frequency domain. In the case of another waveform like a rectangular wave, the modulation comprises a fundamental and a series of harmonics in the frequency domain. Typically modulation frequency refers to the single or fundamental frequency of the modulation, i.e. the frequency of the period over which the waveform repeats.

In embodiments there may be a plurality of luminaires 4i, 4ii in the same environment 2, each configured to embed a different respective coded light component modulated at a respective modulation frequency into the light emitted from the respective lighting element. Alternatively or additionally, a given luminaire 4 may be configured to embed two or more coded light components into the light emitted by that same luminaire's lighting element, each at a different respective modulation frequency, e.g. to enable that luminaire to use frequency keying to embed data. It is also possible that two or more luminaires 4 in the same environment 2 each emit light modulated with two or more respective coded light components all at different respective modulation frequencies. I.e. so a first luminaire 4i may emit a first plurality of coded light components at a plurality of respective modulation frequencies, and a second luminaire 4ii may emit a second, different plurality of coded light components modulated at a second, different plurality of respective modulation frequencies.

Figure 2:
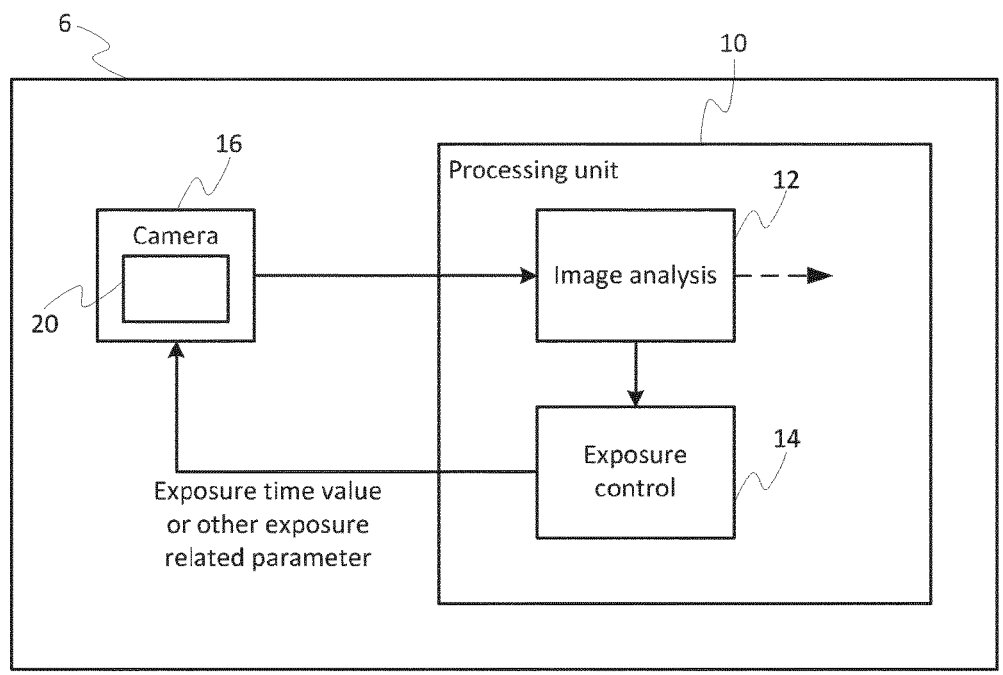
FIG. 2 is a schematic block diagram of a device with camera for receiving coded light, FIG. 3 schematically illustrates an image capture element of a rolling-shutter camera, FIG. 4 schematically illustrates the capture of modulated light by rolling shutter.

FIG. 2 gives a block diagram of the mobile device 6. The device 6 comprises a camera having a two-dimensional image capture element 20, and an image analysis module 12 coupled to the image capture element. The image analysis module 12 is operable to process signals representing images captured by the image capture element and detect coded light components in the light from which the image was captured. In accordance with embodiments disclosed herein, there mobile device 6 also comprises a controller 14 in the form of an exposure control module, the function of which will be discussed shortly. The image analysis module 12 and/or controller 14 may be implemented in the form of code stored on a computer readable storage medium or media and arranged to be executed on a processor 10 comprising one or more processing units. Alternatively it is not excluded that some or all of the image analysis module 12 and/or controller 14 are implemented in dedicated hardware circuitry or reconfigurable circuitry such as an FPGA. Generally the components 12, 14 and 16 may or may not be integrated into the same unit.

The one or more luminaires 4 are configured to emit light into the environment 2 and thereby illuminate at least part of that environment. A user of the mobile device 6 is able to point the camera 16 of the device towards a scene 8 in the environment 2 from which light is reflected. For example the scene could comprise a surface such as a wall and/or other objects. Light emitted by one or more of the luminaire(s) 4 is reflected from the scene onto the two-dimensional image capture element of the camera, which thereby captures a two dimensional image of the scene 8. Alternatively or additionally it is also possible to detect coded light directly from a light source (without reflection via a surface). Hence the mobile device may alternatively be pointed directly at one or more of the luminaire(s) 4.

Figure 3:
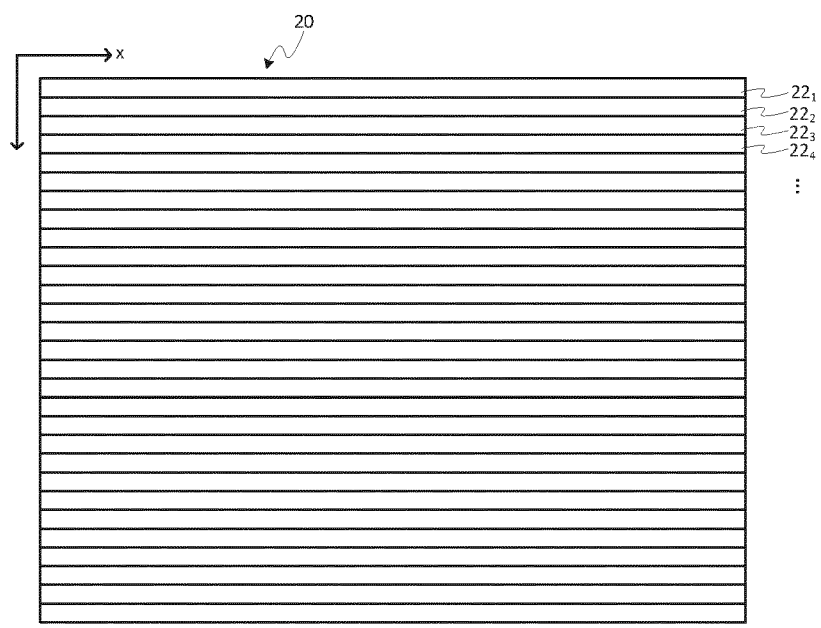

FIG. 3 represents the image capture element 20 of the camera 16. The image capture element 20 comprises an array of pixels for capturing signals representative of light incident on each pixel, e.g. typically a square or rectangular array of square or rectangular pixels. In a rolling-shutter camera, the pixels are arranged into a plurality of lines, e.g. horizontal rows 22. To capture a frame each line is exposed in sequence, each for a successive instance of the camera's exposure time $T_{exp}$. In this case the exposure time is the duration of the exposure of an individual line. Note also that a sequence in the present disclosure means a temporal sequence, i.e. so the exposure of each line (or more generally portion) starts at a slightly different time. For example first the top row $22_1$ begins to be exposed for duration $T_{exp}$, then at a slightly later time the second row down $22_2$ begins to exposed for $T_{emp}$, then at a slightly later time again the third row down $22_3$ begins to be exposed for $T_{emp}$, and so forth until the bottom row has been exposed. This process is then repeated to expose a sequence of frames.

Figure 5:
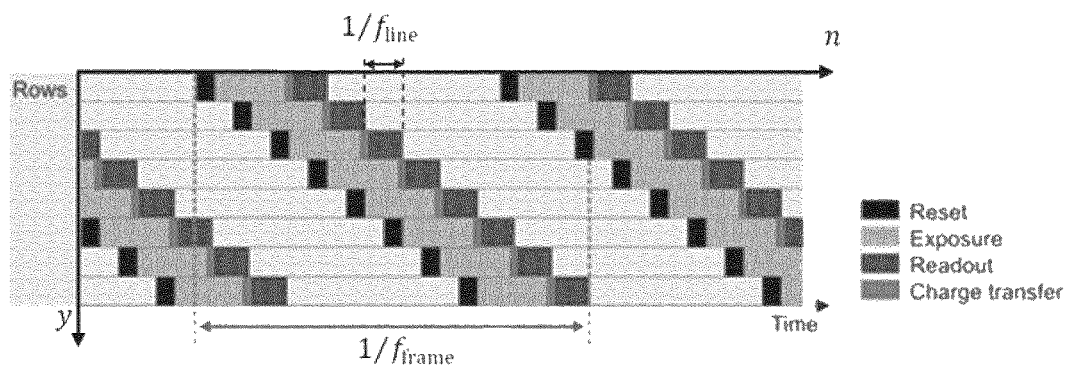
FIG. 5 is an example timing diagram of a rolling-shutter capture process.

FIG. 5 shows an example of a typical rolling shutter timing diagram during continuous video capture.

In WO2012/127439 for example, it has been described how coded light can be detected using a conventional video camera of this type. The signal detection exploits the rolling shutter image capture, which causes temporal light modulations to translate to spatial intensity variations over successive image rows.

Figure 4:
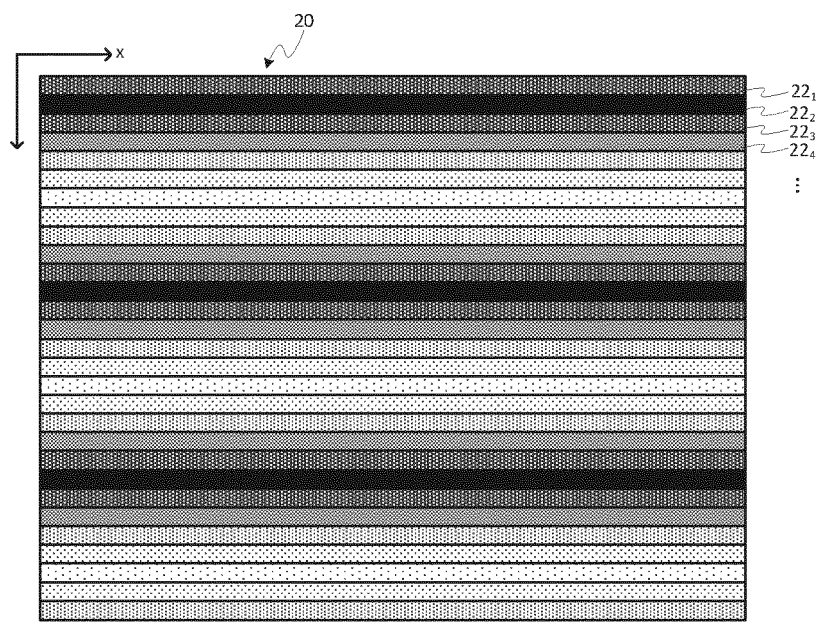

This is illustrated schematically FIG. 4. As each successive line 22 is exposed, it is exposed at a slightly different time and therefore (if the line rate is high enough compared to the modulation frequency) at a slightly different phase of the modulation. Thus each line 22 is exposed to a respective instantaneous level of the modulated light. This results in a pattern of stripes which undulates or cycles with the modulation over a given frame. Based on this principle, the image analysis module 12 is able to detect coded light components modulated into light received by the camera 16.

Figure 6:
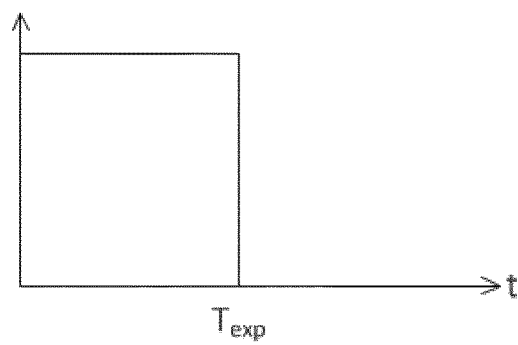
FIG. 6 shows an example transfer function in the time domain.
Figure 7:
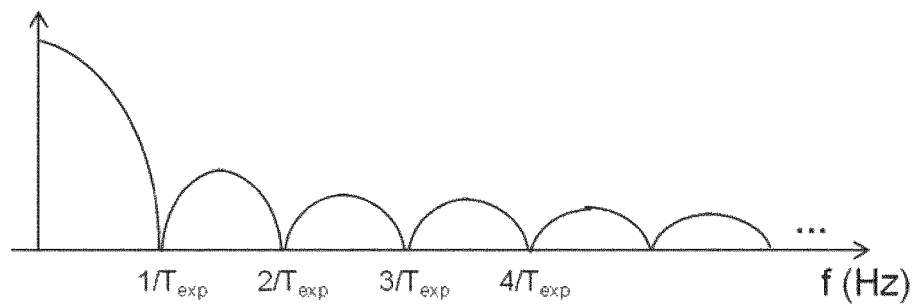
FIG. 7 shows an example transfer function in the frequency domain.

However, the acquisition process produces a low pass filtering effect on the acquired signal. FIGS. 6 and 7 illustrate the low-pass filtering characteristic of the acquisition process of a rolling shutter camera with an exposure time $T_{emp}$.

FIG. 6 is a sketch representing the exposure time as a rectangular block function, or rectangular filter, in the time domain. The exposure process can be expressed as a convolution of the modulated light signal with this rectangular function in the time domain. Convolution with a rectangular filter in the time domain is equivalent to a multiplication with a sinc function in the frequency domain. Hence as illustrated by the sketch given in FIG. 7, in the frequency domain this causes the received signal spectrum to be multiplied by a sinc function. The function by which the received signal spectrum is multiple may be referred to as the transfer function, i.e. it describes the proportion of the received signal spectrum that is actually "seen" by the detection process in the detection spectrum.

Thus the exposure time of the camera is a block function in the time domain and a low pass filter (sinc) in the frequency domain. A result of this is that the detection spectrum or transfer function goes to zero at 1/Texp and integer multiples of 1/Texp. Therefore the detection process performed by the image analysis module 12 will experience blind spots in the frequency domain at or around the zeros at 1/Texp, 2/Texp, 3/Texp., etc. If the modulation frequency falls in one of the blind spots, the coded light component will not be detectable. Note that in embodiments, the blind spot need not be considered to occur only at the exact frequencies of these zeros or nodes in the detection spectrum or transfer function, but more generally a blind spot may refer to any range of frequencies around these zeros or nodes in the detection spectrum where the transfer function is so low that a desired coded light component cannot be detected or cannot be reliably detected.

It would be desirable to avoid a problematic pairing of light source modulation frequency and exposure time of the camera, which can lead to the modulations being undetectable to the camera.

The brute-force solution would be to pre-plan the frequencies of the coded light components and the exposure time of the camera so as not to clash. However, to ensure this worked reliably would require a great deal of coordination between various different manufacturers of devices 6 and lighting 4. Another possible solution would be for the device 6 to feedback an indication of its exposure time or a suitable frequency to the luminaires 4, over a suitable back channel such as an RF channel. However, this could add an undesirable degree of extra infrastructure and again require coordination between manufacturers. Yet another possible solution would be for the a luminaire 4 to gradually vary its modulation frequency or transmit on multiple aharmonic frequencies in parallel, so that the device 6 can always detect the coded light component on one of the frequencies. This would avoid the need to communication between the device 6 and lighting 4. However, it could not be ensured that the lighting would necessarily be equipped with such functionality in all possible environments the device 6 might encounter.

Instead of relying on such possibilities, the present disclosure provides a solution based on the fact that some camera devices provide exposure control. Using this, images can be captured using different exposure times and the results combined to ensure frequency detection in the presence of the exposure-related suppression effect. Alternatively, in case limited exposure control is available, embodiments are provided that ensure frequency detection by controlling another parameter that indirectly varies the exposure time, e.g. ISO setting, exposure value (EV) setting, or a region-of interest.

Figure 8:
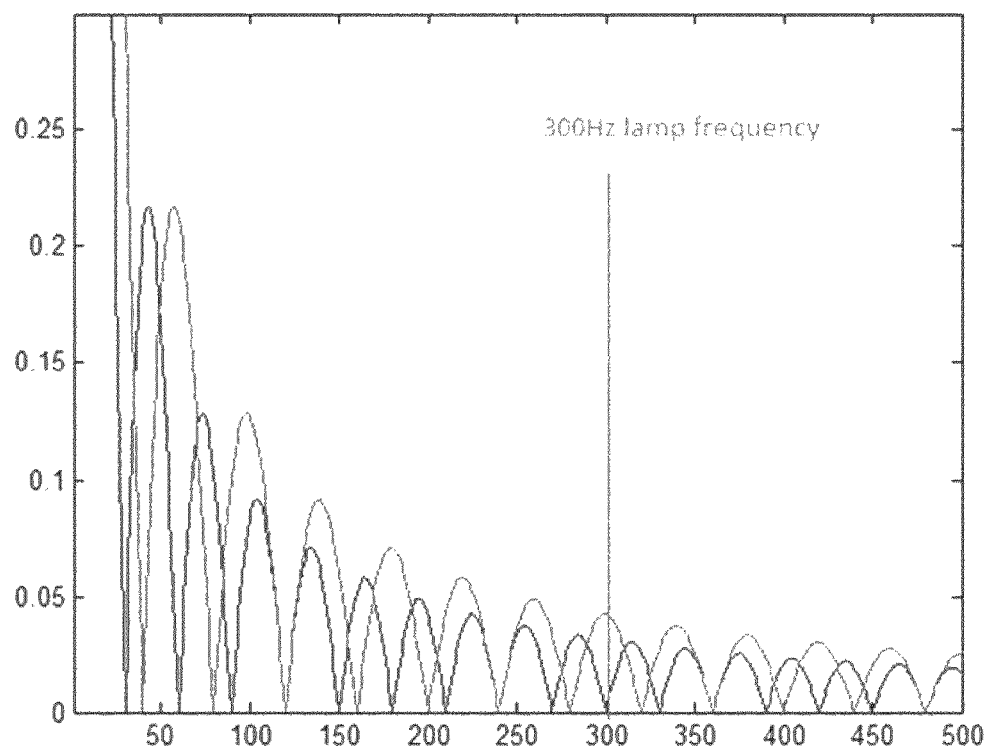
FIG. 8 shows further examples of a transfer function in the frequency domain.

FIG. 8 shows an example transfer function with a 1/30 second exposure time (illustrated as the solid curve in FIG. 8) and one with a 1/40 second exposure time (illustrated as the lighter curve in FIG. 8), and a lamp with one modulation frequency of 300 Hz. If lamp frequency is set on 300 Hz, and exposure of the camera is on 1/30 s (or 1/60, 1/100) then the camera is not able to capture it as there is a zero in transfer function. When the exposure is set to 1/40 s however, then the camera is sensitive to 300 Hz again. The same principle applies to FSK (switching between multiple frequencies).

Referring again to FIG. 2, the device 6 comprises an exposure control module 14 coupled to the camera 6. The exposure control module 14 is configured to control at least one parameter of the camera 6 which affects the exposure time $T_{exp}$, either directly or indirectly.

The control module 14 is configured to capture at least two frames of image data via the camera 16 (e.g. of a smartphone), each frame with a different value of the parameter and therefore a different value of the exposure time $T_{exp}$. Thus if the data encoded in light is undetectable in one frame of image data, it should be detectable in the next.

Advantageously, the proposal enables omission of a back channel to a coded-light luminaire (i.e. the transmitter), since there is no need for the camera (i.e. the receiver) to specify to the luminaire which modulation frequencies should it should not use. Also, a higher transmitted data rate can be used in the case where the transmitter doesn't implement a mechanism to avoid the disadvantageous combination of modulation frequency and exposure time (e.g. the alternative solution of emitting from the luminaire 4 using dual simultaneous or time-varying frequencies would waste half of the bandwidth).

The exposure control module 14 is configured to capture two (or more) different frames with different respective exposure times, and to apply the detection process of the image analysis module 12 individually to the different frames. Each exposure time corresponds to a respective transfer function in the frequency domain, and the different exposure times are spaced far enough apart that the blind spots do not substantially overlap (the undetectable range of frequencies around a zero or node of one exposure times' transfer function does not overlap with the undetectable range around the zero or node of the other exposure time's transfer function). Also the exposure times are arranged so that the frequency locations of their blind spots are suitably non-harmonic, at least so that one value of 1/Texp is not an integer multiple of the other value of 1/Texp. This way, when the image analysis module 12 is applied to the different frames captured with the different respective exposure times, at least one will always provide a positive detection (assuming a coded light component is present to be detected).

In embodiments, this could be implemented by configuring the exposure module 14 to try two (or more) particular exposure times predetermined to have these properties. Alternatively, the exposure control module 14 may be configured to scan through a plurality or range of different exposure times so as to try a detection with each.

Note therefore that it is not necessary to know the actual location of the frequency blind spots. As long as the exposure time is varied between at least two different captured images, it can be ensured that modulation will be detectable in at least one of those images.

In embodiments, the exposure control module 14 and image analyses module 12 may capture a frame and attempt detection based on each of the different exposure times when the received light is probed or queried for a coded light signal or sample, and the image analysis module 12 may then select one or more of the frames from amongst the captured frames that produced a positive detection, or could even average or accumulate the captured frames to produce an aggregate image from which the coded light can be detected. Alternatively the exposure control module 14 may be configured to switch, cycle or scan through the different values of the parameter only until the image analysis module 12 reports a positive detection.

Once a value of the parameter has been found that results in a positive detection, this may be stored for future use. Alternatively the different values of the parameter may be attempted on every occasion the received light is probed or queried for a coded light signal or sample.

The operation of querying the received light for a coded light signal may be triggered for example in response to a user input, or automatically, e.g. at intervals such as periodically.

In embodiments, the parameter used to influence the exposure time may comprise an explicit exposure time setting which the controller 14 can directly control.

Alternatively if the exposure time cannot be directly set (or even as an additional way of controlling exposure time) then one of the following methods can be used to indirectly obtain images with different exposure times. These methods involve controlling another parameter which is not an exposure time setting per se, but which indirectly influences the exposure time.

In one such example, the exposure control module 14 may be configured to achieve different exposure times by applying different values of an exposure index (EI) setting of the camera 16, typically referring to the ISO setting. This specifies the level of sensitivity of the camera to light.

In another example, the "exposure value" (EV) setting may be varied (note this is not the "exposure index" or the "exposure time value"). The EV control is intended to enforce under- or over-exposure. The exposure is the amount of light received by the sensor and is dependent on both the camera's aperture and the exposure time. The adjustment generally goes in fractional stop decrements or increments (e.g. ±⅓, ±½, ±1, ±2 or ±3 stops) of the camera's default or predetermined exposure. This is typically relative to the current (auto selected) exposure time.

In yet another example, the parameter(s) controlled by the exposure control module 14 comprise a setting or settings specifying a "region of interest" (ROI) within a frame, on the basis of which the camera adjusts its exposure parameters. The "region of interest" is a selected sub area within the area of a frame. In this case the exposure control module 14 selects at least two regions in the frame area, say, a bright and dark region of the scene being captured. By capturing a frame with an ROI in a dark region and a frame with an ROI placed in a light region, the exposure parameters (including the exposure time) will then be varied automatically by the camera in response to the variation of ROI location. This may be useful for example if none of the exposure parameters can be set directly, and the mobile embedded camera 16 can only receive the location of an exposure ROI. This situation is quite common in current mobile devices.

It will be appreciated that the above embodiments have been described only by way of example. For instance, the invention is applicable in a wide range of applications, such as detection of coded light with camera based devices such as smartphones and tablet computers, camera-based coded light detection (e.g. for light installation in the consumer and professional domain), personalized light control, light-based object labeling, and light based indoor navigation.

Further, the applicability of the invention is not limited to avoiding blind spots due to rolling shutter techniques, or to blind spots in any particular filtering effect or detection spectrum. For example, a global shutter could be used if the frame rate was high enough, in which case the exposure time can still have an effect on the frequency response of the detection process. It will be appreciated given the disclosure herein that the use of different exposure times can reduce the risk of modulation going undetected due to frequency blind spots resulting from any side effect or limitation related to the exposure time of any detection device being used to detect the modulated light.

As mentioned, where the modulation takes the form of a non-sinusoidal waveform like a rectangular wave, typically the modulation frequency refers to the fundamental frequency. In the above examples where the blind spots occur at integer multiples of 1/Texp, then for waveforms like a rectangular wave made up of a fundamental and harmonics an integer multiples of the fundamental, ensuring that the fundamental modulation frequency avoids a blind spot also means the harmonics avoid the blind spots. Nonetheless, generally it is not excluded that the coded light component is considered to be modulated with the frequency of the fundamental and/or any desired harmonic, and avoiding that the modulation frequency corresponds to a blind spot can mean avoiding that the fundamental and/or any desired harmonic (that affects the ability to detect the component) falls in a blind spot.

The above has been described in terms of trying out different exposure times in different frames, but in other implementations it is not excluded that the controller 14 could use different exposure times in, say different halves or more generally portions of the same frame. Alternatively, each different exposure time could be used over a group of frames, and the detection applied to each of the different groups.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device comprising:
   at least one hardware processor;
   an input of the at least one hardware processor adapted to receive image data representing light captured by a camera, the camera having an exposure time and the light being captured over a sequence of exposures each lasting for an instance of the exposure time,
   wherein the at least one hardware processor is adapted to perform an image analysis to detect a coded light component modulated into the light with a modulation frequency, there being a frequency blind spot in said detection due to an effect of said exposure time; and
   an output of the at least one hardware processor adapted to control one or more parameters of the camera which vary a length of the exposure time,
   wherein the at least one hardware processor is configured to control the one or more parameters to avoid that the modulation frequency corresponds to the frequency blind spot.

2. The device of claim 1, wherein the at least one hardware processor is configured to perform said control by: varying the one or more parameters to try out at least two different lengths of the exposure time, and performing the image analysis to attempt said detection under each of the different lengths of the exposure time.

3. The device of claim 2, wherein the at least one hardware processor is configured, based on said attempts, to determine a value or values of the one or more parameters resulting in detection of the coded light component, and to set the determined value or values to be used for further detection of the coded light component.

4. The device of claim 1, wherein the light is captured over a sequence of frames, and in each frame the light is captured by exposing a sequence of spatial portions within the frame, each of the spatial portions in the sequence being exposed to the light for an instance of the exposure time.

5. The device of claim 4, wherein the camera is a rolling shutter camera, each of said spatial portions being lines of the frame.

6. The device of claim 4, wherein the at least one hardware processor is configured to try out the different lengths of exposure time in different ones of the frames.

7. The device of claim 1, wherein the one or more parameters comprise an exposure time setting explicitly specifying the length of the exposure time.

8. The device of claim 1, wherein the one or more parameters comprise an exposure index specifying a sensitivity to light.

9. The device of claim 1, wherein the one or more parameters comprise an exposure value setting specifying a degree of under or over exposure.

10. The device of claim 6, wherein the frames have a frame area and the one or more parameters comprise a region-of-interest setting specifying a region within the frame area, which affects the exposure time in dependence on a brightness or darkness of the region.

11. The device of claim 1, wherein there are multiple frequency blind spots in said detection due to the effect of said exposure time, and the at least one hardware processor is configured to control the one or more parameters to avoid that the modulation frequency corresponds to any of the multiple blind spots.

12. The device of claim 11, wherein the blind spots are at integer multiples of $1/T_{exp}$ where $T_{exp}$ is the exposure time.

13. The device of claim 11, wherein said detection has a sinc shaped transfer function in the frequency domain, the blind spots being due to zeros in the sinc shaped transfer function.

14. The device of claim 1, wherein the image analysis detects multiple coded light components modulated into the light at different respective modulation frequencies, and the at least one hardware processor is configured to control the one or more parameters to avoid that any of the modulation frequencies of the multiple coded light components correspond to the blind spot.

15. A computer program product comprising code embodied on a non-transitory computer-readable storage medium, wherein the code, when executed by a processor, causes the processor to perform operations of:
   receiving image data representing light captured by a camera, the camera having an exposure time and the light being captured over a sequence of exposures wherein each exposure lasts for an instance of the exposure time;
   performing a detection process for detecting a coded light component modulated into the light with a modulation frequency, there being a frequency blind spot in said detection process due to an effect of said exposure time; and
   controlling one or more parameters of the camera which vary a length of the exposure time to avoid that the modulation frequency corresponds to the frequency blind spot.

16. The device of claim 1, wherein the modulation frequency is a first modulation frequency, wherein the frequency blind spot is a given modulation frequency at which any coded light component modulated into the light with the given modulation frequency is undetectable by said image analysis and wherein the at least one hardware processor is-configured to control the one or more parameters to avoid that the first modulation frequency matches the frequency blind spot.

17. The device of claim 2, wherein the modulation frequency is a first modulation frequency, wherein the frequency blind spot is a given modulation frequency at which any coded light component modulated into the light with the given modulation frequency is undetectable by said image analysis, wherein the first modulation frequency matches the frequency blind spot under a first length of said at least two different lengths of the exposure time and wherein the first modulation frequency falls outside of any frequency blind spot of detection under a second length of said at least two different lengths of the exposure time.

18. A method comprising:
   receiving image data representing light captured by a camera, the camera having an exposure time and the light being captured over a sequence of exposures wherein each exposure lasts for an instance of the exposure time;
   performing, by at least one hardware processor, a detection process for detecting a coded light component modulated into the light with a modulation frequency, there being a frequency blind spot in said detection process due to an effect of said exposure time; and
   controlling, by the at least one hardware processor, one or more parameters of the camera which vary a length of the exposure time to avoid that the modulation frequency corresponds to the frequency blind spot.

19. The method of claim 18, wherein the modulation frequency is a first modulation frequency, wherein the frequency blind spot is a given modulation frequency at which any coded light component modulated into the light with the given modulation frequency is undetectable by said detection process and wherein the controlling comprises controlling the one or more parameters to avoid that the first modulation frequency matches the frequency blind spot.

20. The method of claim 18, wherein the modulation frequency is a first modulation frequency, wherein the frequency blind spot is a given modulation frequency at which any coded light component modulated into the light with the given modulation frequency is undetectable by said detection process, wherein the controlling comprises varying the one or more parameters to try out at least two different lengths of the exposure time, wherein the performing comprises attempting said detection process under each of the different lengths of the exposure time, wherein the first modulation frequency matches the frequency blind spot under a first length of said at least two different lengths of the exposure time and wherein the first modulation frequency falls outside of any frequency blind spot of detection under a second length of said at least two different lengths of the exposure time.

\* \* \* \* \*